United States Patent Office 3,803,103
Patented Apr. 9, 1974

3,803,103
POLYIMIDES FROM DIMER DIAMINES AND ELECTRICAL INSULATION
Daniel Magay, Palo Alto, Calif., assignor to Raychem Corporation, Menlo Park, Calif.
No Drawing. Filed Aug. 25, 1969, Ser. No. 852,921
Int. Cl. C08g 20/32
U.S. Cl. 260—78 TF                    19 Claims

ABSTRACT OF THE DISCLOSURE

Copolyimides derivable from straight chain (e.g., $C_{12}$) and branched chain (e.g., $C_{36}$ or "dimer") diamine and tetracarboxylic (e.g., pyromellitic) acid moieties are described, together with electrical insulation and memory materials made from the copolymers.

---

This invention relates to polyimides, more especially to thermoplastic polyimides.

In British specification No. 570,858 there are disclosed polyimides derived from tricarboxylic and tetracarboxylic acids, or derivatives thereof, and diamines or derivatives thereof. These polyimides are said to be useful as fiber-forming materials. In U.S. Pat. No. 2,710,853 there are disclosed three further examples of such polyimides, stated to be suitable for injection molding. These polyimides are nonamethylene, 4,4-dimethylheptamethylene and 3-methylheptamethylene polypyromellitimides. Many other polyimides are of course known and described, for example those in U.S. Pat. Nos. 3,179,614, 3,179,630, 3,179,631, 3,179,632, 3,179,633, 3,179,634, 3,207,728, 3,299,101 and 3,413,267, but in general they are not capable of being processed in the molten state. These polyimides, being derived from substantially aromatic moieties, are generally intractable and structures from them usually have to be formed in situ from the precursor, the polyamic acid, by heating or chemical conversion, loosely refered to as "curing." This curing process, limits the thickness of the structure which can be formed. The resulting cured structure is a hard, insoluble, rigid material, which can withstand much mechanical, thermal and chemical abuse. None of the above-mentioned patents, however, describe materials which are suitable for extrusion, the melting points of the polypyromellitimides of U.S. Pat. No. 2,710,853 being too high for this purpose.

In the manufacture of electrical insulation, many different materials have been used with more or less success to meet the ever-increasing demands of a variety of users. In the insulation of wire and cable, for example, the requirements demand that the material have a number of properties, many of them incompatible. For example, the user may (and often does) require that the insulation be capable of withstanding accidental damage by cutting, tearing or abrasion and, at the same time, that it be light in weight, flexible, and easy to strip from the conductor or from an intermediate shielding or insulating layer. The material should have good electrical properties, but should, at the same time, be flame resistant—a property usually achieved by incorporation of materials that impair the electrical properties. The material should also be resistant to any chemicals with which it comes into contact and be able to withstand extremes of temperature. The high temperature requirement necessitates a high melting point which causes processing problems, many necessary additives being unstable if subjected to high processing temperatures for prolonged periods.

SUMMARY OF THE INVENTION

It is accordingly an object of the invention to provide a polymer which combines resistance to high temperatures with a moderate processing temperature, allowing the use of a broad range of additives. It is a further object of the invention to provide electrical insulation material comprising such a polymer. It is a still further object of the invention to provide hot-melt adhesives.

The present invention accordingly provides a polyimide having repeating units of the formula

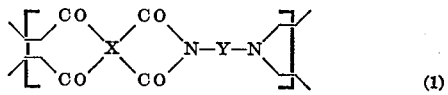
(1)

wherein X represents a tetravalent organic radical and Y represents a divalent radical, the radical Y in some units being a branched chain aliphatic radical, the number of carbon atoms being such that the imide nitrogen atoms in the unit are separated by at least 10 carbon atoms, and the radical Y in other units being a 1,12-dodecamethylene or a 1,13-tridecamethylene radical.

Advantageously, the branched chain radical is derived from a predominantly aliphatic branched diamine having at least 16 carbon atoms, the nitrogen atoms being separated by at least 10 carbon atoms, at least a third of the carbon atoms being in a branch chain, at least one branch chain containing at lest 6 carbon atoms.

Preferably, the copolyimide contains branched chain aliphatic radicals of two or more different structures.

The radical X may represent the residue of any one or more of the tetracarboxylic acids or anhydrides actually used or disclosed in the literature as suitable for use in the manufacture of polyimides. As such materials there may be mentioned those described in U.S. Pat. Nos. 3,179,614, 3,179,630, 3,179,631, 3,179,632, 3,179,633, 3,179,634, 3,207,728, 3,299,101 and 3,413,267, the disclosures of which are incorporated by reference herein. In general, X may represent any tetravalent radical containing at least two carbon atoms having no more than two free valencies at any one carbon atom; preferably X represents the residue of a tetracarboxylic acid in which carbonyl groups are attached in pairs to adjacent carbon atoms or to a pair of carbon atoms separated by only one other atom, so that each imide group in the unit forms part of a 5 or 6 membered ring. For example, the acid may be pyromellitic acid
2,3,6,7-naphthalene tetracarboxylic acid
3,3',4,4'-diphenyl tetracarboxylic acid
1,2,5,6-naphthalene tetracarboxylic acid
2,2',3,3'-diphenyl tetracarboxylic acid
2,2-bis(3,4-dicarboxyphenyl)propane
3,4,9,10-perylene tetracarboxylic acid
bis(3,4-dicarboxyphenyl)ether
ethylene tetracarboxylic acid
naphthalene-1,2,4,5-tetracarboxylic acid
naphthalene-1,4,5,8-tetracarboxylic acid
decahydronaphthalene-1,4,5,8-tetracarboxylic acid
4,8-dimethyl-1,2,3,5,6,7-hexahydronaphthalene-1,2,5,6-tetracarboxylic acid
2,6-dichloronaphthalene-1,4,5,8-tetracarboxylic acid
2,7-dichloronaphthalene-1,4,5,8-tetracarboxylic acid
2,3,6,7-tetrachloronaphthalene-1,4,5,8-tetracarboxylic acid
phenanthrene-1,8,9,10-tetracarboxylic acid
cyclopentane-1,2,3,4-tetracarboxylic acid
pyrrolidine-2,3,4,5-tetracarboxylic acid
pyrazine-2,3,5,6-tetracarboxylic acid
2,2-bis(2,3-dicarboxyphenyl)propane
1,1-bis(2,3-dicarboxyphenyl)ethane
1,1-bis(3,4-dicarboxyphenyl)ethane
bis(2,3-dicarboxyphenyl)methane
bis(3,4-dicarboxyphenyl)methane
bis(3,4-dicarboxyphenyl)sulfone
benzene-1,2,3,4-tetracarboxylic acid
1,2,3,4-butane tetracarboxylic acid thiophene-2,3,4,5-tetracarboxylic acid
3,4,3',4'-benzophenone tetracarboxylic acid
2,3,2',3'-benzophenone tetracarboxylic acid
2,3,3',4'-benzophenone tetracarboxylic acid or
tetrahydrofuran 2,3,4,5-tetracarboxylic acid of which pyromellitic acid is preferred.

The polymer may have units containing 1,12-dodecamethylene radicals, units containing 1,13-tridecamethylene radicals or it may have units of both types. Preferably, the polymer has units containing 1,12-dodecamethylene radicals.

The branched chain radical in other units may be any divalent radical, other than a straight chain radical, of predominantly aliphatic character, provided that the imide nitrogen atoms in the unit are separated by at least 10 carbon atoms. For example, the units or some of the units may contain saturated, unsaturated or aromatic rings, for example 6 membered rings such as cyclohexyl, cyclohexenyl, cyclohexadienyl or benzene rings. The polymer is preferably substantially free from oxidation-prone unsaturated bonds for applications where the requirement of oxidative stability is paramount.

Preferred branched chain radicals are the residues of products derived from commercially available materials commonly known as "Dimer Acids". These materials are obtainable by combination of unsaturated long chain fatty acids, for example, oleic or linoleic acids. The resulting "dimer" is a mixture of many isomers, with various degrees of unsaturation and ring formation, depending on the unsaturation of the starting materials. The precise structure of the isomers and the proportions of each isomer in the mixture vary with the method of combination (which varies according to the manufacturer) and, of course, the starting material or materials.

The structure of these materials has been the subject of considerable investigation. To indicate the background of this aspect of the invention, the following references are listed, but it is to be understood that the scope of the present application is not limited by or to the structures disclosed in the references.

Based on the work of R. F. Paschke, L. E. Peterson, and D. H. Wheeler, Journal of the American Oil Chemists' Society, 41, 723 (1964), it is conjectured that four possible structures for thermal dimers of 10-trans,12-trans-linoleic acid are

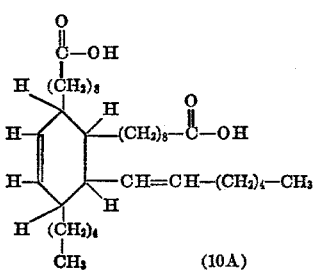

(10A)

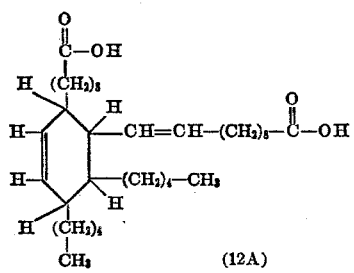

(12A)

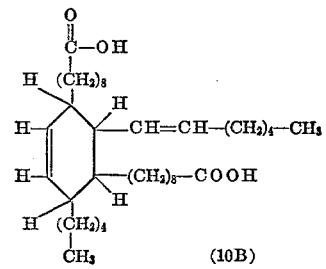

(10B)

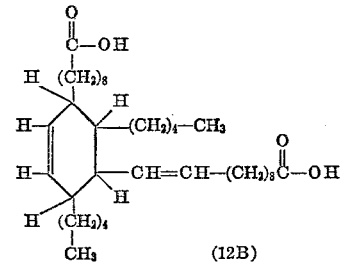

(12B)

It will be noted that the number of carbon atoms between the carbonyl carbons varies between 18 and 21, that is, that the chain length is between 20 and 23 inclusive of the carbonyl carbons. Further, it will be noted that there are branches of up to 9 carbon atoms (in structure 10B) exclusive of the ring carbons.

J. C. Cowan, Journal of the American Oil Chemists' Society, 39, 723 (1962), discusses generally the possible structures of similar dimers. Emery Industries, Inc. Technical Bulletin 412B "Abstracts of Dimer Acid Use—Patents and Journal References," January 1967, at pages 2 and 3, gives abstracts of a number of references, and R. F. Paschke, L. E. Peterson, S. A. Harrison and D. H. Wheeler, Journal of the American Oil Chemists' Society, 41, 56 (1966), discuss the structures of the dehydrodimer from methyl oleate with di-t-butyl peroxide. These references all in turn refer to other relevant literature.

These dimer acids, whatever their precise structure, which varies from producer to producer, all contain a mixture of isomers. At least some of the isomers, and in most cases all, contain some unsaturated carbon-to-carbon bonds, and if oxidative stability is important these are preferably removed by hydrogenation to give a saturated, or predominantly saturated, product. It has been found that while all dimer acids may be converted into suitable starting materials for the manufacture of polyimides of the present invention, the various methods of manufacture and different starting materials used by the different manufacturers result in a range of polyimides having a range of utilities.

The dimer acids are converted to diamines (or other nitrogen-containing compounds capable of forming imides) by methods which are known per se and which form no part of this invention, and which will therefore not be described in detail herein. It may be stated, however, that one convenient method involves hydrogenation of dimer acid to a predominantly saturated form, conversion to the dinitrile and reduction of the dinitrile to the diamine. As stated above, this diamine provides the preferred skeleton for the branched chain divalent radical Y, and throughout this specification the term "dimer diamine" will be used to denote this mixture of predominantly saturated isomeric diamines.

Advantageously, all the repeating units in the copolymer are of the above-specified Formula 1, but it is to be understood that the polymer may contain small proportions of other repeating units.

Preferably, the polymer consists essentially of units of Formula 1 in which the radical X is derived from pyromellitic anhydride. Some radicals Y are derived from 1,12-dodecanediamine and the remaining radicals Y are derived from dimer diamine.

The copolymer may contain any proportions of dimer diamine-based units and dodecamethylene-containing units. It has been found that copolymers having increasing proportions of dimer diamine units show steadily increasing elongation, and steadily decreasing modulus, melting point and density. The tensile strength of copolymers comprising up to about 90% of dimer-diamine derived units remains surprisingly constant, falling off rapidly at some level above 90% to the strength of the polymer derived wholly from dimer diamine. It is to be understood that all such percentages refer to mole percent of the various diamine starting materials.

The high tensile strength of the copolymer up to about 90% dimer diamine level, coupled with the gradual change in the other above-mentioned physical properties allows the selection of, for example, a polymer having a desired melting point or flexibility with the knowledge that the tensile strength of the material will not be affected to any substantial extent. Preferably, for use as cable insulation, the copolymer contains from about 75 to 55 mole percent of 1,12-dodecamethylene units.

The invention further provides a polyimide having repeating units of the Formula 1, wherein X represents a tetravalent organic radical and Y represents a divalent radical, Y in some units being a straight-chain aliphatic, preferably an alkylene, radical containing from 6 to 24 carbon atoms, and Y in other units being a dimer radical.

The copolymers of the invention may be manufactured by any of the methods generally known or described in the literature for the manufacture of polyimides, for example those disclosed in British Pat. No. 570,858 and U.S. Pat. No. 2,710,853.

For example, the copolymers can be made by reaction of the anhydride or an imide-forming equivalent thereof with the diamines or imide-forming equivalents thereof either in the melt or preferably in solution. The solution reaction may be carried out in any solvent for one of the reactants which is inert to the reactants and the copolymer under the reaction conditions; preferably, the solvent is one in which the copolymer is insoluble. As examples of suitable solvents there may be N,N-dimethylacetamide, N,N-dimethylformamide, N-methyl-2-pyrrolidone, dimethyl sulfoxide, and mixtures thereof. The reaction is preferably carried out under a non-oxidizing atmosphere, for example, under nitrogen, under anhydrous conditions, initially at a temperature within the range of from about —20° C. to about 160° C., and finally at about 150° to about 250° C. (depending upon the boiling temperature of the solution).

The reaction may also be carried out in the melt using an imide-forming derivative of the anhydride, for example, the ethyl ester.

The molecular weight of the copolymer may be influenced by a number of factors, among which may be mentioned the relative proportions of the primary reactants and the presence of additional reactants, either amine or acid, which participate in the reaction both as capping agents and as reactants capable of breaking an amide or imide group already formed. As examples of such materials, there may be mentioned primary aliphatic monoamines, primary aromatic amines or aromatic or aliphatic anhydrides, for example, aniline, laurylamine, succinic anhydride, and phthalic anhydride. The molecular weight of the polymer may be increased by the addition of polyfunctional amines, i.e., compounds containing 3 or more primary amino groups. As examples of such compounds there may be mentioned melamine and "trimer triamine," which is the corresponding trifunctional compound to the dimer diamine, and is often present in very minor amounts in the diamine. The polyfunctional amine is advantageously present in amounts not exceeding 5 mole percent of the total amine, preferably not exceeding 2 mole percent.

It has been found that when only the primary reactants are present, the molecular weight of the copolymer is dependent on their relative proportions, and that a small departure from equimolar proportions has a large effect on the molecular weight. Generally, the proportions should be such as to give an inherent viscosity, measured at 70° C. in m-cresol (0.5 g./100 ml.), of at least about 0.5, preferably 0.75 to 5 deciliters/gm. References throughout this specification, including the claims, to inherent viscosities are to viscosities measured in this way. It has been found that if the diamines are present in too great an excess the polyimide will be crosslinked, and not thermoplastic, whereas if the anhydride is in great excess the polyimide will have too low a molecular weight, resulting in a polymer which is brittle. Thus, above an inherent viscosity of about 5 and below about 0.5, the polymer is non-thermoplastic and brittle, respectively. Because of the difficulty of obtaining pure reactants, and the greater difficulty of accurately analyzing the reactants, especially the anhydride, it is not possible to state precisely the permissible range of proportions of reactants. It appears, however, that the proportion of anhydride to total diamine may deviate from equimolar by up to about 10%, but preferably up to about 5%, on the amine-rich side and up to about 10%, but preferably up to about 5%, on the anhydride-rich side of equimolarity while still yielding a melt-fabricable polymer.

The polyimides of the present invention are thermoplastic polymers. They can be shaped by extrusion, molding, etc., to form sheets, films, tubing, wire insulation, etc. Structures formed from the polyimides have extremely good elongation and tear resistances, the material having good dielectric properties. The polymers comprising a large proportion of branched chain radical-containing units are suitable for use as hot melt adhesives.

Compositions containing the polyimides of the present invention may also comprise antioxidants, flame retardants, pigments, fillers and other additives in general use. Many important additives cannot be used with materials requiring processing temperatures above about 300° C., and thus the polymers of the present invention which are processable at temperatures about 260° C.–275° C. are unique among the useful polyimides. Any of the additives known in the art may be used. As examples, there may be mentioned; as antioxidants, N,N'-di-β-naphthyl-p-phenylene-diamine, 1,3,5-trimethyl-2,4,6-tris(3,5-di-tert-butyl-4-hydroxybenzyl)benzene, distearyl thiodipropionate, phenyl didecyl phosphite, Irganox 1010 (pentaerythrityl tetra-3,5-di-tert-butyl-4-hydroxydihydrocinnamate) and 4,4'-thiobis(6-tert-butyl-m-cresol).

The good high temperature properties of articles made from the polyimides may be enhanced by crosslinking of the articles either by chemical means or by irradiation. The radiation dose needed for crosslinking depends on the molecular weight of the polymer; doses from about 5 to 100 Mrad are suitable. Such irradiated, crosslinked polyimide materials have form stability above the softening point and have all the advantages of crosslinked materials in general combined with the good high temperature properties of the original polyimide.

The doses needed to crosslink a polymer of the invention to a given extent, as measured by its gel content and its Young's modulus above the crystalline melting point, can be reduced by incorporating in the composition to be irradiated a poly-functional monomer which promotes irradiation crosslinking. As monomers suitable for use in conjunction with the polymers, there may be mentioned by way of example monomers having a plurality of ethylenically unsaturated carbon-to-carbon bonds, e.g., triallyl trimellitate, diallyl phthalate and isophthalate, triallyl cyanurate and isocyanurate, tetraallyl pyromellitate, dienes, e.g., 1,11-dodecadiene, and bis-maleimides, e.g., dodecamethylene bis-maleimide or p-phenylene bis-maleimide. The polyfunctional monomer is advantageously present in proportion up to about 10%, preferably up to 5%, based on the weight of the polyimide.

The monomers mentioned above are themselves thermally polymerizable and it is especially desirable in some cases, when a polyfunctional monomer is present, also to add a compound known to act as a free radical scavenger, to inhibit homo-polymerization of the monomer. As scavengers, there may be mentioned hydroquinones, e.g., hydroquinone and hindered hydroquinones, and aromatic phenols, for example those mentioned above as phenolic antioxidants.

The present invention also provides an article made from a composition comprising the crosslinked copolymers which article has the property of elastic memory. An article having this property is one which has been deformed from an original heat-stable dimensional form into a different, heat-unstable form. While this article is maintained below a certain temperature, it will retain its unstable form, but when it is heated to above this temperature, termed the recovery temperature, it will recover toward its original form. One method of imparting the property of elastic memory is disclosed in U.S. Pat. No. 3,086,242 to Cook et al., the disclosure of which is incorporated by reference herein. Many examples of articles having the property of elastic memory are given in U.S. Pat. Nos. 3,243,211 and 3,297,819 to Judson Douglas Wetmore and application Ser. No. 228,300 by Paul M. Cook (British Pat. No. 1,033,959) the disclosures of which are incorporated by reference herein.

The copolymers may also be used, especially those containing a large percentage of dimer diamine-derived units, in the uncrosslinked state as hot melt adhesives.

The present invention also provides insulation for an electrical component consisting of or comprising the copolymers of the invention, as well as insulated electrical components, especially electrical wire and cable. Their outstanding elongation and tear resistance, combined with relatively low modulus and high tensile strength, render them especially suitable for use as the jacket of electrical wire or cable.

The invention is further illustrated by reference to the following examples:

EXAMPLE 1

Empol 1010 is an acid stated by its manufacturers, Emery Industries, Inc. to be a $C_{36}$ dibasic acid produced by the polymerization at mid-molecule of two unsaturated monobasic acids to give a long chain dibasic acid with two or more alkyl side chains near the center of the molecule. It is believed to be saturated. Empol is a trademark.

By heating the acid with ammonia and polyphosphoric acid, the corresponding nitrile is formed, and the nitrile is catalytically hydrogenated to produce the diamine, which is an off-white transparent liquid.

A one liter, three-necked flask fitted with a mechanical stirrer, thermometer and a nitrogen inlet tube was dried in an oven at 150° C. 450 g. of N-methyl-2-pyrrolidone was introduced under a nitrogen blanket. The flask was charged with 13.011 g. of 1,12-dodecanediamine and 15.000 g. of dimer diamine and was heated to 85° C. to dissolve the diamines present in a molar ratio of 70:30 ($C_{12}$ diamine:dimer diamine). The solution was cooled with stirring to 35° C. and 2.2335 g. of pyromellitic dianhydride was added. The temperature of the solution rose to 50° C. in 5 minutes. The viscosity of the light yellow solution increased. Thirty minutes after the addition of the pyromellitic anhydride the temperature had fallen to 39° C. The flask was then immersed in an oil bath at 200° C. The temperature of the reaction mixture increased to 160° C. in 15 minutes and was maintained at that temperature for an additional 30 minutes. During this period the light yellow solution turned to a dark orange color. The temperature was then raised to 172° C. and maintained 45 minutes. The mixture was then cooled in an ice bath. At 142° C., the solution became cloudy. More precipitate formed on further cooling. The precipitate was suspended in 500 ml. methanol, stirred in a Waring blender and filtered. This procedure was repeated. The fine white precipitate was dried in a vacuum oven at 100° C., until no more liquid was collected in the trap. The temperature of the oven was then increased to 150° C. and maintained for 4 hours. The inherent viscosity of the fine yellowish powder was 0.71 dl./g. The properties of the polymer are as follows:

| | |
|---|---|
| Density (g./cm.$^3$) | 1.15 |
| Tensile strength (p.s.i. at room temperature) (200%/min.) | 6500±300 |
| Elongation at break (percent at room temperature) (200%/min.) | 420 |
| Melting point, ° C. | 256 |

EXAMPLE 2

In a manner similar to that described in Example 1, a copolymer derived from 90% dimer diamine and 10%, 1,12-dodecanediamine was prepared.

Properties of the polymer

| | |
|---|---|
| Density (g./cm.$^3$) | 1.05 |
| Tensile strength (p.s.i. at room temperature) (200%/min.) | 4500 |
| Elongation at break (percent at room temperature) (200%/min.) | 550 |
| Melting point (° C.) | 125±3 |

EXAMPLE 3

The gradual change in properties of the dimer diamine-1,12-dodecanediamine/pyromellitic polymers with proportions of the two types of amine is shown in Table I.

TABLE I

| $C_{12}$ diamine, percent | Melting point, ° C., ±3° C. | Tensile strength, p.s.i., 300 p.s.i. | Elongation (percent) | Density |
|---|---|---|---|---|
| 10 | 125 | 4,500 | 550 | 1.05 |
| 20 | 157 | 4,500 | 480 | 1.07 |
| 30 | 177 | 6,000 | 430 | 1.08 |
| 40 | 192 | 5,700 | 420 | 1.10 |
| 50 | 200 | 6,300 | 400 | 1.11 |
| 60 | 240 | 5,800 | 390 | 1.12 |
| 70 | 256 | 6,500 | 420 | 1.15 |
| 80 | 270 | 6,000 | 300 | 1.17 |
| 90 | 284 | 6,700 | 250 | 1.19 |

EXAMPLE 4

In a flask as described in Example 1, 20.320 g. of 1, 12-dodecanediamine was added to 425 g. of N-methyl-2-pyrrolidone at 25° C. The mixture was heated to 90° C. to dissolve the diamine, and cooled to 45° C. when 23.948 g. of dimer diamine was added. The molar ratio of dimer diamine to $C_{12}$ diamine is 30:70. 30.731 g. of tetrahydrofuran 2,3,4,5-tetracarboxylic dianhydride was added, the temperature rose to 75° C. and a clear solution was formed after a few minutes. The mixture was stirred for an hour, and then heated to 170° C. and maintained, with stirring, at that temperature for a further hour. The brown mixture was cooled to 20° C. and poured into water containing a little methanol. The filtered precipitate was dried at 100° C. The melting point of the polymer was 165° C. and had a room temperature elongation, measured at 200%/minute, of 273%.

EXAMPLE 5

By a procedure similar to that of Example 4, a 30:70 copolymer of dimer diamine: $C_{12}$ diamine with 3,4,3',4'-benzophenone tetracarboxylic dianhydride was made.

The polymer was non-crystalline, with a transition temperature of about 70° C. Other properties:

| | |
|---|---|
| Color | Brown. |
| Tensile strength (p.s.i. at room temperature) (200%/min.) | 8500. |
| Elongation at break (percent at room temperature) (200%/min.) | 203. |
| Percent gel | 80–85. |

The polymer was formed into a slab at 270° C.

A strip from the slab, marked with fiduciary marks 1 inch apart, was heated to 75° C. and stretched until the marks were 3 inches apart and cooled while stretched. 24 hours later, the marks were still 3 inches apart. The strip was then immersed in water at 75° C. and allowed to shrink. The distance between the marks was 1 inch. It is believed that the polymer shows memory because of crosslinking (as indicated by the high gel content) between the polymer chains.

EXAMPLE 6

Two 20 AWG insulated stranded copper conductors each of outside diameter of 0.06 inch were formed into a twisted pair and shielded with a tin coated copper braid. The primary insulation was a laminate consisting of two layers of poly(1,12-dodecamethylene pyromellitimide) (to a diameter of 0.05 inch) and two layers of poly (4,4'-phenyl ether pyromellitimide). The twisted pair was then shielded with a tin-coated copper braid, to give a maximum section of 0.126 inch.

The copolymer of Example 1 was then applied to the shielded twisted pair by tubing from a 1.5 inch Sterling 24 to 1 length/diameter extruder, operating at temperatures from 237° C. to 262° C. at 50 feet per minute, a layer of 0.007±0.0005 inch being applied. A jacketed, shielded twisted pair of maximum sections 0.141 inch was produced.

These examples are only illustrative of the invention and should not be regarded as limiting the scope. A wide variety of materials can be used for the radicals represented by X and Y over a wide range of compositions to achieve the desired properties, and selection of proper radicals and proportions is a matter of choice. The scope of the invention is to be limited only by the lawful scope of the appended claims.

I claim:

1. A polyimide having repeating units of structure

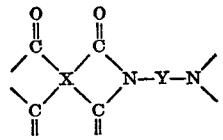

wherein N is nitrogen; X is a tetravalent organic radical containing at least two carbon atoms having not more than two free valencies at any one carbon atom; each imide group of said unit being a five or six-membered ring, the carbonyl moieties thereof being attached to vicinal carbon atoms of the radical X or to carbons separated by but a single carbon atom; and Y in some of said units being the divalent hydrocarbon radical of a dimer diamine having about 36 carbon atoms, Y in others of said units being an unbranched aliphatic radical containing from 6 to 24 carbon atoms.

2. A polyimide according to claim 1 wherein X is a tetravalent aromatic radical.

3. A polyimide according to claim 2 wherein X is

4. A polyimide according to claim 2 wherein said unbranched aliphatic radicals are selected from the group consisting of 1,12-dodecamethylene and 1, 13-tridecamethylene divalent radicals.

5. A polyimide according to claim 4 wherein said hydrocarbon radical is saturated.

6. A polyimide according to claim 2 wherein said unbranched aliphatic radicals are selected from the group consisting of 1,12-dodecamethylene and 1,13-tridecamethylene divalent radicals.

7. A polyimide according to claim 6 wherein said hydrocarbon radical is saturated.

8. A polyimide according to claim 2 wherein said hydrocarbon radical is saturated.

9. A polyimide according to claim 2 wherein X is

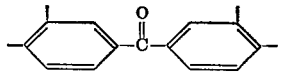

10. A polyimide according to claim 2 consisting essentially of said repeating units, about 10% to about 90% of said units having divalent radicals which are the divalent hydrocarbon radicals of said dimer diamine and about 90% to about 10% of said units having as divalent radicals 1, 12-dodecamethylene radicals.

11. A polyimide according to claim 10 wherein X is

12. A crosslinked polyimide according to claim 2.
13. A crosslinked polyimide according to claim 10.
14. A crosslinked polyimide according to claim 11.
15. An insulated electrical component having at least one layer of insulation comprised of the polyimide of claim 2.
16. An article according to claim 15 wherein said hydrocarbon radical is saturated and wherein the component insulated is wire or cable.
17. An insulated component having at least one layer of insulation consisting essentially of the polyimide of claim 11, Y in about 70% of the repeating units being the divalent 1, 12-dodecamethylene radical and in about 30% of the units the divalent radicals of said dimer diamine, said hydrocarbon radical being saturated.
18. A polyimide according to claim 10 wherein X is

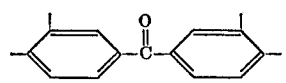

19. A memory material comprised of the polymer of claim 18.

References Cited

UNITED STATES PATENTS

| | | | |
|---|---|---|---|
| 2,710,853 | 6/1955 | Edwards et al. | 260—78 |
| 2,880,230 | 3/1959 | Edwards et al. | 260—78 X |
| 3,086,242 | 4/1963 | Cook et al. | 264—230 X |
| 3,242,128 | 3/1966 | Chalmers | 260—78 X |
| 3,297,819 | 1/1967 | Wetmore | 264—230 X |
| 3,342,768 | 9/1967 | Chalmers | 260—78 X |
| 3,489,725 | 1/1970 | Lucas | 260—78 |
| 3,161,608 | 12/1964 | Caldwell et al. | 260—13 |

FOREIGN PATENTS

| | | | |
|---|---|---|---|
| 1,037,374 | 7/1966 | Great Britain | 260—78 |
| 905,475 | 9/1962 | Great Britain | 260—78 |

OTHER REFERENCES

New Linear Polymers, Lee et al., 1968, p. 252.

HOWARD E. SCHAIN, Primary Examiner

U.S. Cl. X.R.

117—128.4, 161P, 232; 161—214, 227; 204—159,19; 260—45.95, 47 CP, 48, 78 TF